United States Patent
Lineberry et al.

(10) Patent No.: US 7,546,989 B1
(45) Date of Patent: Jun. 16, 2009

(54) LEAF BAGGING APPARATUS

(76) Inventors: Janet F. Lineberry, 3645 Smithtown Rd., East Bend, NC (US) 27018; Susan M. Duryea, 3645 Smithtown Rd., East Bend, NC (US) 27018

( * ) Notice: Subject to any disclaimer, the term of this patent is extended or adjusted under 35 U.S.C. 154(b) by 0 days.

(21) Appl. No.: 12/204,611

(22) Filed: Sep. 4, 2008

(51) Int. Cl.
*B65B 67/04* (2006.01)
(52) U.S. Cl. .................... 248/99; 15/257.1; 141/391
(58) Field of Classification Search .............. 248/95, 248/97–101; 15/257.1, 257.3, 257.8; 294/1.3, 294/1.4, 19.1, 55; 141/314, 391
See application file for complete search history.

(56) References Cited

U.S. PATENT DOCUMENTS

| | | | |
|---|---|---|---|
| 3,747,653 A | 7/1973 | Ringer | |
| 3,998,415 A | 12/1976 | D'Antonio et al. | |
| 4,019,768 A * | 4/1977 | Niece | 294/1.3 |
| 5,011,103 A | 4/1991 | Hayes et al. | |
| 5,039,149 A * | 8/1991 | Gish | 294/1.4 |
| 5,149,028 A | 9/1992 | Blackaby et al. | |
| 5,180,126 A * | 1/1993 | Bennett | 248/99 |
| 5,183,339 A | 2/1993 | Williams | |
| D342,816 S | 12/1993 | Diotte | |
| 6,076,782 A * | 6/2000 | Alderman | 248/97 |
| 6,491,264 B1 * | 12/2002 | Valesquez | 248/97 |
| 6,994,301 B1 * | 2/2006 | Fox | 248/97 |
| 2005/0011997 A1 | 1/2005 | Kalal | |

* cited by examiner

*Primary Examiner*—Korie Chan
(74) *Attorney, Agent, or Firm*—Crossley Patent Law; Mark A. Crossley

(57) ABSTRACT

A leaf bagging apparatus is collapsible in the disassembled state, thereby aiding in transport and storage. Further, the net assembly provides a much sturdier temporary container for leaves and debris than do plastic bags. Also, the net breathes. The net assembly removably fastens to the frame via grommets and hooks. The frame with attached net assembly is held in an open-mouthed position via the removable triangular supports. The supports feature bottom legs and angled legs are fitted with flex clips that are angularly attached via collars. The collars offer a strengthened attachment which also positions the triangular supports is a substantially vertical plane, thereby holding the net fully open. This full open net is especially advantageous in the use of leaf blowers in filling the relatively large net with debris.

1 Claim, 5 Drawing Sheets

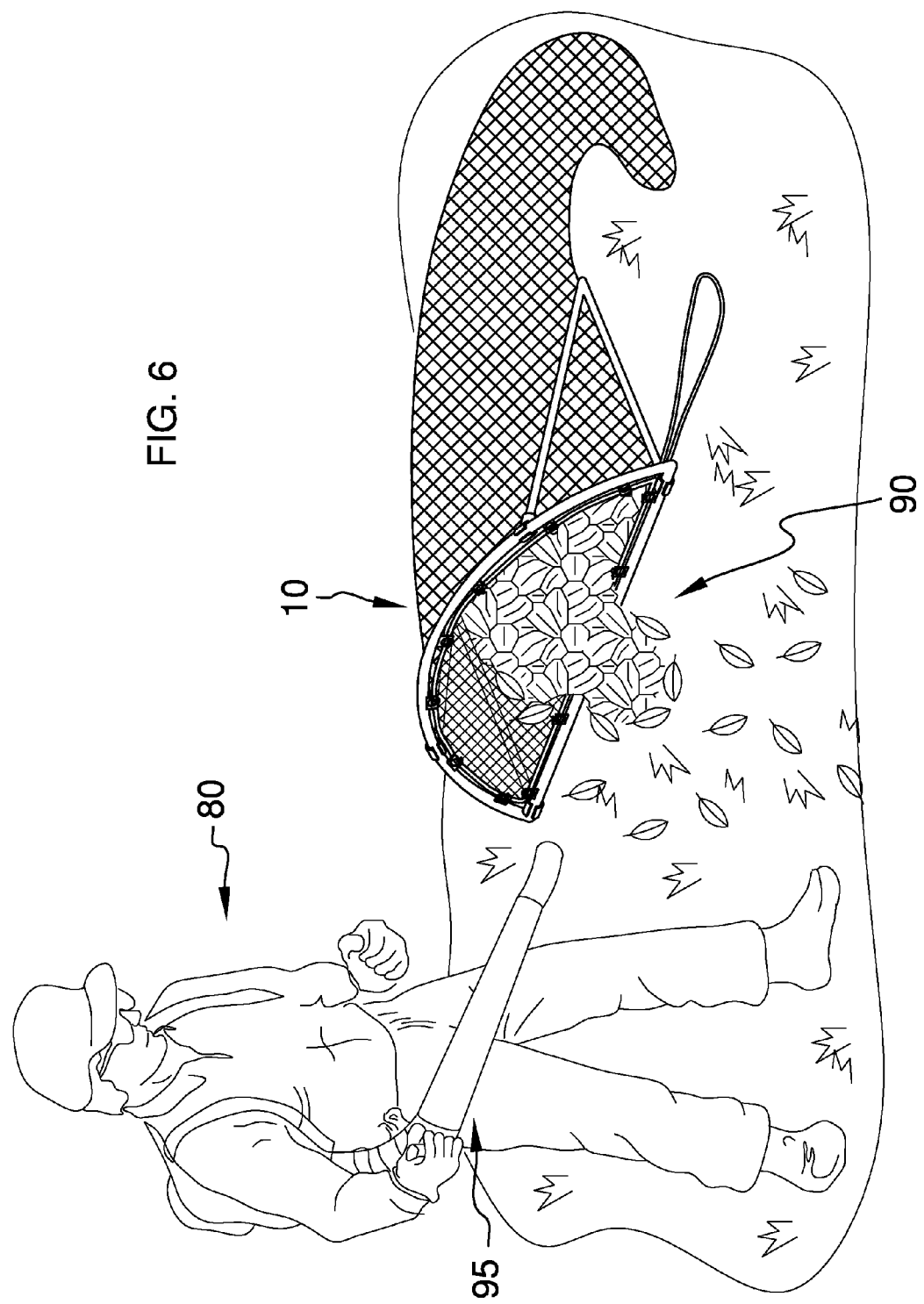

LEAF BAGGING APPARATUS

BACKGROUND OF THE INVENTION

A number of leaf and debris gathering devices have been proposed. With the crowded art, even small differences are significant. Those devices previously proposed each offer unique features. Some devices have used zippers, plastic bags, wire hoops, all of which are desirable to some and in some instances but not to all. The current apparatus provides a relatively large net assembly which is uniquely supported in an open position, thereby aiding in easier leaf and lawn debris gathering, especially when using a leaf blower. The apparatus is lightweight and collapsible to aid in storage and transport.

FIELD OF THE INVENTION

The leaf bagging apparatus relates to lawn debris bags and more especially to a collapsible lightweight apparatus with removable net assembly.

SUMMARY OF THE INVENTION

The general purpose of the leaf bagging apparatus, described subsequently in greater detail, is to provide a leaf bagging apparatus which has many novel features that result in an improved leaf bagging apparatus which is not anticipated, rendered obvious, suggested, or even implied by prior art, either alone or in combination thereof.

To attain this, the leaf bagging apparatus is collapsible in the disassembled state, thereby aiding in transport and storage. Further, the net assembly provides a much sturdier temporary container for leaves and debris than do plastic bags. Nylon and other advantageous materials are used in the net's construction. Also, the net breathes, and plastic bags do not. Matter decay within plastic bags is often quite fast and generates heat, an often undesirable trait. The net assembly removably fastens to the frame via grommets and hooks. The frame with attached net assembly is held in an open-mouthed position via the removable triangular supports. The supports feature bottom legs and angled legs are fitted with flex clips that are angularly attached via collars. The collars offer a strengthened attachment which also positions the triangular supports is a substantially vertical plane, thereby holding the net fully open. This full open net is especially advantageous in the use of leaf blowers in filling the relatively large net with debris.

Thus has been broadly outlined the more important features of the improved leaf bagging apparatus so that the detailed description thereof that follows may be better understood and in order that the present contribution to the art may be better appreciated.

An object of the leaf bagging apparatus is to be especially effective when combined with the use of a leaf blower in gathering lawn debris.

Another object of the leaf bagging apparatus is to be selectively collapsible.

A further object of the leaf bagging apparatus is to selectively provide a large opening for admitting and removing debris.

An added object of the leaf bagging apparatus is to be durable.

And, an object of the leaf bagging apparatus is to be selectively free standing.

Yet another object of the leaf bagging apparatus is to provide an easily detachable net assembly.

These together with additional objects, features and advantages of the improved leaf bagging apparatus will be readily apparent to those of ordinary skill in the art upon reading the following detailed description of presently preferred, but nonetheless illustrative, embodiments of the improved leaf bagging apparatus when taken in conjunction with the accompanying drawings.

In this respect, before explaining the current embodiments of the improved leaf bagging apparatus in detail, it is to be understood that the leaf bagging apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved leaf bagging apparatus. It is therefore important that the claims be regarded as including such equivalent constructions insofar as they do not depart from the spirit and scope of the leaf bagging apparatus. It is also to be understood that the phraseology and terminology employed herein are for purposes of description and should not be regarded as limiting.

BRIEF DESCRIPTION OF THE DRAWINGS

FIG. 6 is a perspective view of the apparatus in use.

DETAILED DESCRIPTION OF THE DRAWINGS

With reference now to the drawings, and in particular FIGS. 1 through 6 thereof, the principles and concepts of the leaf bagging apparatus generally designated by the reference number 10 will be described.

Figure 1:
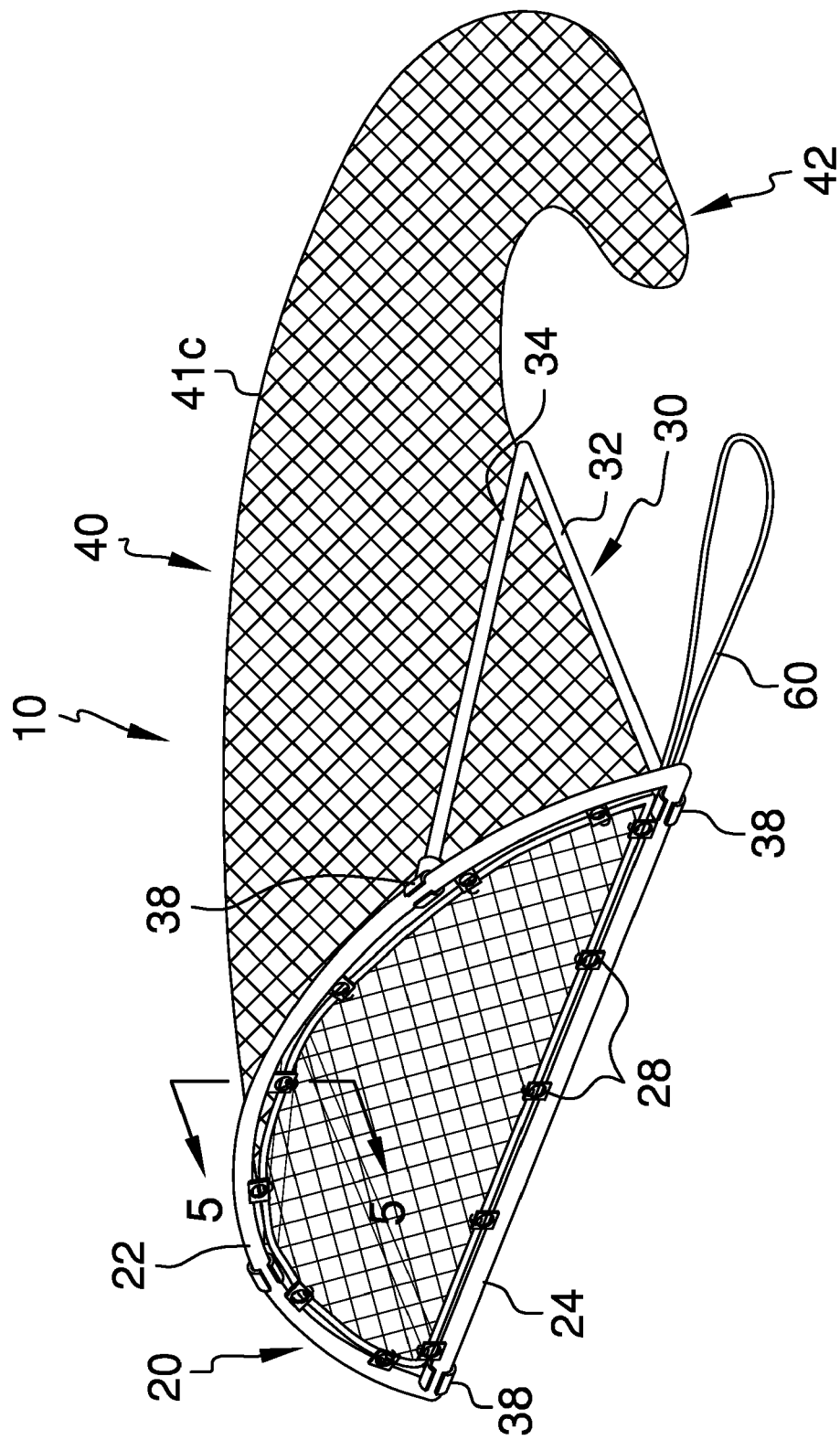
FIG. 1 is a perspective view, assembled.
Figure 2:
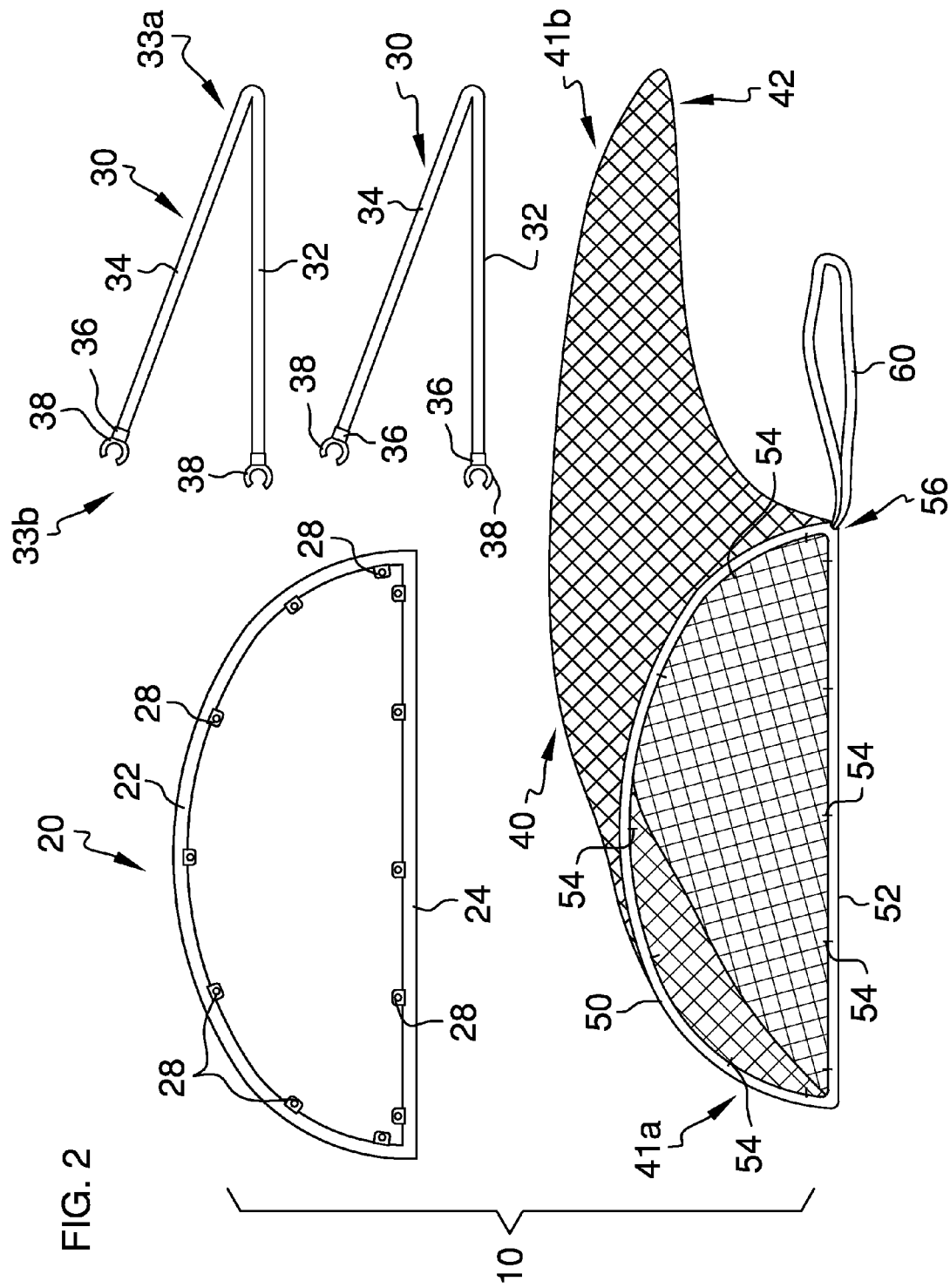
FIG. 2 is a perspective view, disassembled.
Figure 3:
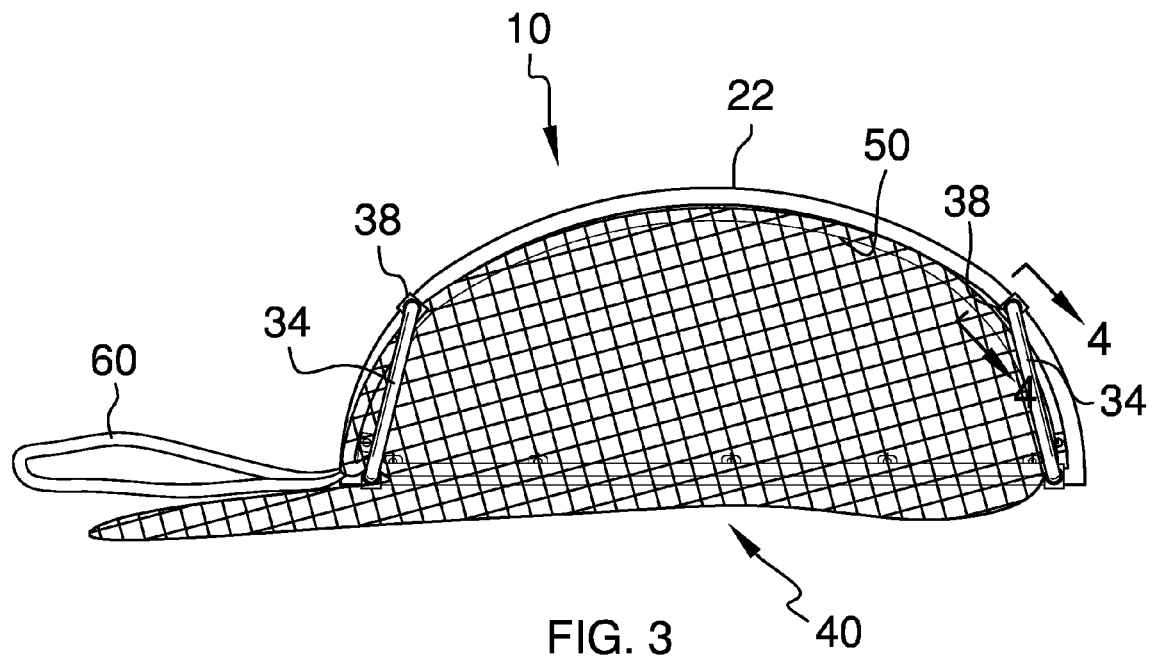
FIG. 3 is a rear perspective view, assembled.
Figure 4:
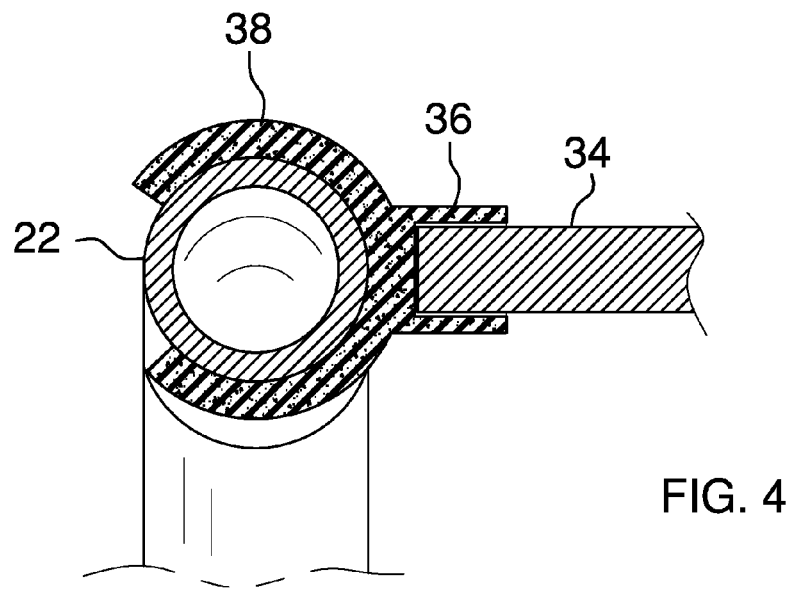
FIG. 4 is a partial cross sectional view of FIG. 3.
Figure 5:
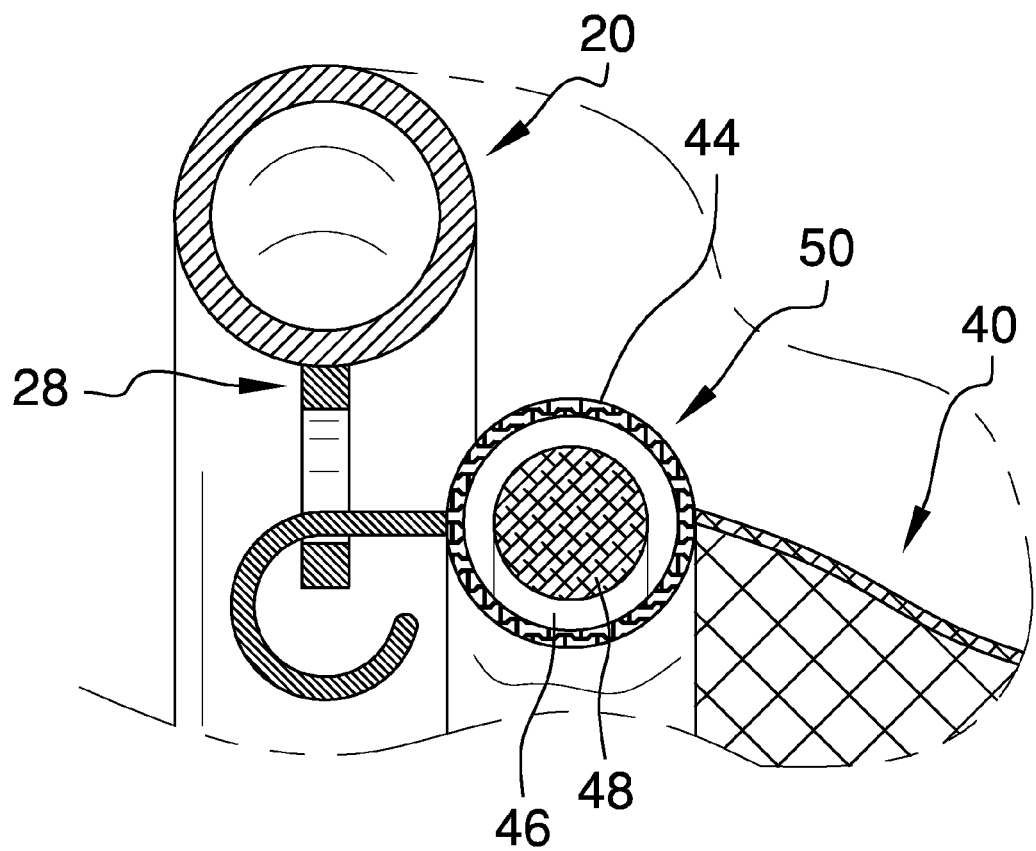
FIG. 5 is a partial cross sectional view of FIG. 1.

Referring to FIGS. 1 and 6, the leaf bagging apparatus 10 provides a net assembly 40 selectively attached to the frame 20. The apparatus 10 provides a net assembly 40 which is automatically and selectively held open in order for a user 80 to easily fill the net assembly 40 with leaves 90 or other debris. The triangular supports 30 are detachable and provide for the net assembly 40 to be held in the open, easily accessed position. Whether a blower 95 is used or even a rake or other device, the net assembly 40 is easily filled, and, conversely, easily emptied when chosen.

Referring to FIGS. 2-5, the apparatus 10 further comprises, in combination, the semicircular frame 20 having a horizontal bottom 24 affixed to an arch 22. The plurality of spaced apart grommets 28 is affixed to the bottom 24 and to the arch 22. Each grommet 28 faces the interior of the frame 20. The pair of individual identical triangular supports 30 is provided. Each support 30 is removably affixed to the frame 20. Each support 30 comprises a bottom leg 32 affixed to an angular leg 34 at a first end 33a of the support 30. A collar 36 is affixed to each of the bottom leg 32 and the angular leg 34 at a second end 33b of each support 30. A flex clip 38 is affixed to each collar 36. Each flex clip 38 is affixed angularly to each second end 33b such that each flex clip 38 selectively secures each triangular support 30 to the bottom 24 and to the arch 22 of the frame 20 with each triangular support 30 in a substantially vertical plane. The net assembly 40 has an assembly first end 41a and an assembly second end 41b. The net assembly further comprises the net 41c which has a tapered end 42 at the assembly second end 41b.

The net assembly 40 further comprises the net arch 50 affixed to the net bottom 52 at the assembly first end 41a. The net arch 50 and net bottom 52 are of a like shape to that of the frame 20. The net arch 50 and net bottom 52 further comprise the external surround 44. The net 41c is affixed to the external surround 44. The interior support 46 is disposed within the external surround 44. The cord 48 is disposed within the interior support 46. The cord 48 exits the orifice 56 of the arch 22 and bottom 24, the cord 48 extended to form a carry strap 60. The plurality of spaced apart hooks 54 is affixed to the net arch 50 and net bottom 52. Each hook 54 is disposed in correspondence to each grommet 28 of the frame 20. Each hook 54 selectively hooks to each corresponding frame 20 grommet 28.

With respect to the above description then, it is to be realized that the optimum dimensional relationships for the parts of the leaf bagging apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the leaf bagging apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the leaf bagging apparatus may be used.

Therefore, the foregoing is considered as illustrative only of the principles of the leaf bagging apparatus. Further, since numerous modifications and changes will readily occur to those skilled in the art, it is not desired to limit the leaf bagging apparatus to the exact construction and operation shown and described, and accordingly, all suitable modifications and equivalents may be resorted to, falling within the scope of the leaf bagging apparatus.

What is claimed is:

1. A leaf bagging apparatus, comprising, in combination:
   a semicircular frame having a horizontal bottom affixed to an arch;
   a plurality of spaced apart grommets affixed to the bottom and to the arch, each grommet facing an interior of the frame;
   a pair of individual identical triangular supports, each support removably affixed to the frame, each support comprising:
     a bottom leg affixed to an angular leg at a first end of the support;
     a collar affixed to each of the bottom leg and angular leg at a second end of each support;
     a flex clip affixed to each collar, each flex clip affixed angularly to each second end such that each flex clip selectively secures each triangular support to the bottom and the arch of the frame with each triangular support in a substantially vertical plane;
   a net assembly removably secured to the frame, the net assembly having a first end and a second end, the net assembly comprising:
     a net;
     a tapered end at the second end of the net;
     a net arch affixed to a net bottom at the first end of the net assembly, the net arch and net bottom of a like shape to that of the semicircular frame, the net arch and net bottom further comprising:
       an external surround affixed to the net;
       an interior support within the external surround;
       a cord within the interior support, the cord exiting an orifice of the arch and the bottom, the cord extended to form a carry strap;
       a plurality of spaced apart hooks affixed to the net arch and net bottom, each hook disposed in correspondence to each grommet of the frame, each hook selectively hooked to each corresponding frame grommet.

\* \* \* \* \*